United States Patent
Mei

(10) Patent No.: US 9,287,776 B2
(45) Date of Patent: Mar. 15, 2016

(54) LOW POWER SWITCHING MODE REGULATOR HAVING AUTOMATIC PFM AND PWM OPERATION

(71) Applicant: Texas Instruments Incorporated, Dallas, TX (US)

(72) Inventor: Tawen Mei, Sunnyvale, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/333,241

(22) Filed: Jul. 16, 2014

(65) Prior Publication Data

US 2015/0035511 A1   Feb. 5, 2015

Related U.S. Application Data

(60) Provisional application No. 61/860,033, filed on Jul. 30, 2013.

(51) Int. Cl.
    *G05F 1/00* (2006.01)
    *H02M 3/156* (2006.01)

(52) U.S. Cl.
    CPC ........... *H02M 3/156* (2013.01); *H02M 3/1563* (2013.01)

(58) Field of Classification Search
    CPC .................... H02M 3/156; H02M 3/1563
    USPC ................................. 323/282–285
    See application file for complete search history.

(56) References Cited

U.S. PATENT DOCUMENTS

| 2003/0231012 A1* | 12/2003 | Corva et al. ............ 323/285 |
| 2009/0322299 A1* | 12/2009 | Michishita et al. ...... 323/282 |
| 2010/0033261 A1* | 2/2010 | Stevenson et al. ........ 332/109 |

* cited by examiner

*Primary Examiner* — Jue Zhang
(74) *Attorney, Agent, or Firm* — William B. Kempler; Frank D. Cimino

(57) ABSTRACT

A circuit and method for operating a switching mode power supply. A clock is driven by a current source to generate pulses at a fixed frequency using pulse width modulation for normal load demands. For light load demands, the current to the clock is reduced, and therefore the clock generates pulses at a lower, variable frequency and fixed duration using pulse frequency modulation. Thus, depending on the load condition, either fixed frequency pulses or fixed duration pulses are automatically provided to a power stage for conversion to an output voltage.

16 Claims, 5 Drawing Sheets

LOW POWER SWITCHING MODE REGULATOR HAVING AUTOMATIC PFM AND PWM OPERATION

CROSS-REFERENCE

This application claims priority from U.S. Provisional Patent Application No. 61/860,033 filed Jul. 30, 2013, entitled Low Power Switching Mode Power Supply Regulator IC Architecture with Automatic and Seamless PFM and PWM Operation, which is incorporated herein by reference in its entirety.

TECHNICAL FIELD

This disclosure relates in general to electronic circuits, and in particular to a circuit and method for automatically changing between pulse width modulation and pulse frequency modulation in the operation of a switching regulator depending on the load demand.

BACKGROUND

Electronic equipment is often powered from a DC power source, such as a battery or DC power supply, and the supplied DC voltage must be well filtered and regulated to be useful.

A DC-DC power converter is an electronic circuit that converts a source of direct current from one voltage level to another. DC-DC converters are widely used in a variety of electronic equipment applications, including power supplies for portable electronic devices, and are used generally in electronic circuits to regulate an output voltage. For example, a DC-DC converter may be used to compensate for varying load current and/or variations in the input voltage.

Linear regulators are commonly used and have many desirable characteristics, such as simplicity, low output ripple, excellent line and load regulation, fast response time to load or line changes, and low EMI. However, they also have low efficiency due to power dissipated as heat, and occupy large volumes of silicon real estate. Thus, linear regulators are practical only if the current requirement is low.

Switching mode regulators are generally preferred to linear regulators because the conversion method is more power efficient for many applications. In a switching mode converter, a power field effect transistor ("FET") is used to switch efficiently at high frequency.

Pulse width modulation ("PWM") is a converter architecture that uses a fixed-frequency oscillator to drive the power switches to thereby transfer energy from the input to the output. The oscillator drive signal is fixed in frequency but varies in duty cycle, namely the ratio of switch ON time to the total switching period. The duty cycle is varied by adjusting the pulse width of the drive signal for each clock cycle based on operating conditions.

PWM converters offer a predictable operating frequency, low output ripple characteristics, and high efficiency during moderate to heavy load conditions. However, PWM converters suffer from poor conversion efficiency at light load or standby conditions, i.e., when the demand for energy from the load is less than the energy that can be supplied by the regulator circuit.

Pulse frequency modulation ("PFM") is an alternative converter architecture that uses a variable-frequency clock to drive the power switches. In particular, PFM control mode can provide better low-power conversion efficiency and simple converter topologies.

Thus, it would be desirable to provide a converter/regulator that utilizes PWM for normal load conditions and PFM for light load conditions, with automatic and seamless transition between the two modes.

DETAILED DESCRIPTION

This disclosure describes an integrated circuit architecture and method for a low power, switched mode power supply/regulator that provides automatic and seamless operating transition between pulse width modulation ("PWM") and pulse frequency modulation ("PFM"). A current source drives a clock to generate pulses at a fixed frequency using pulse width modulation for normal load demands. For light load demands, i.e., when the demand for energy from the load is less than the energy that can be supplied by the regulator circuit, the current to the clock is reduced and the clock generates pulses having a fixed duration at a lower, variable frequency using pulse frequency modulation. Thus, depending on the load condition, either the PWM pulses or the PFM pulses are automatically provided to a power stage for conversion to an output voltage.

Figure 1:
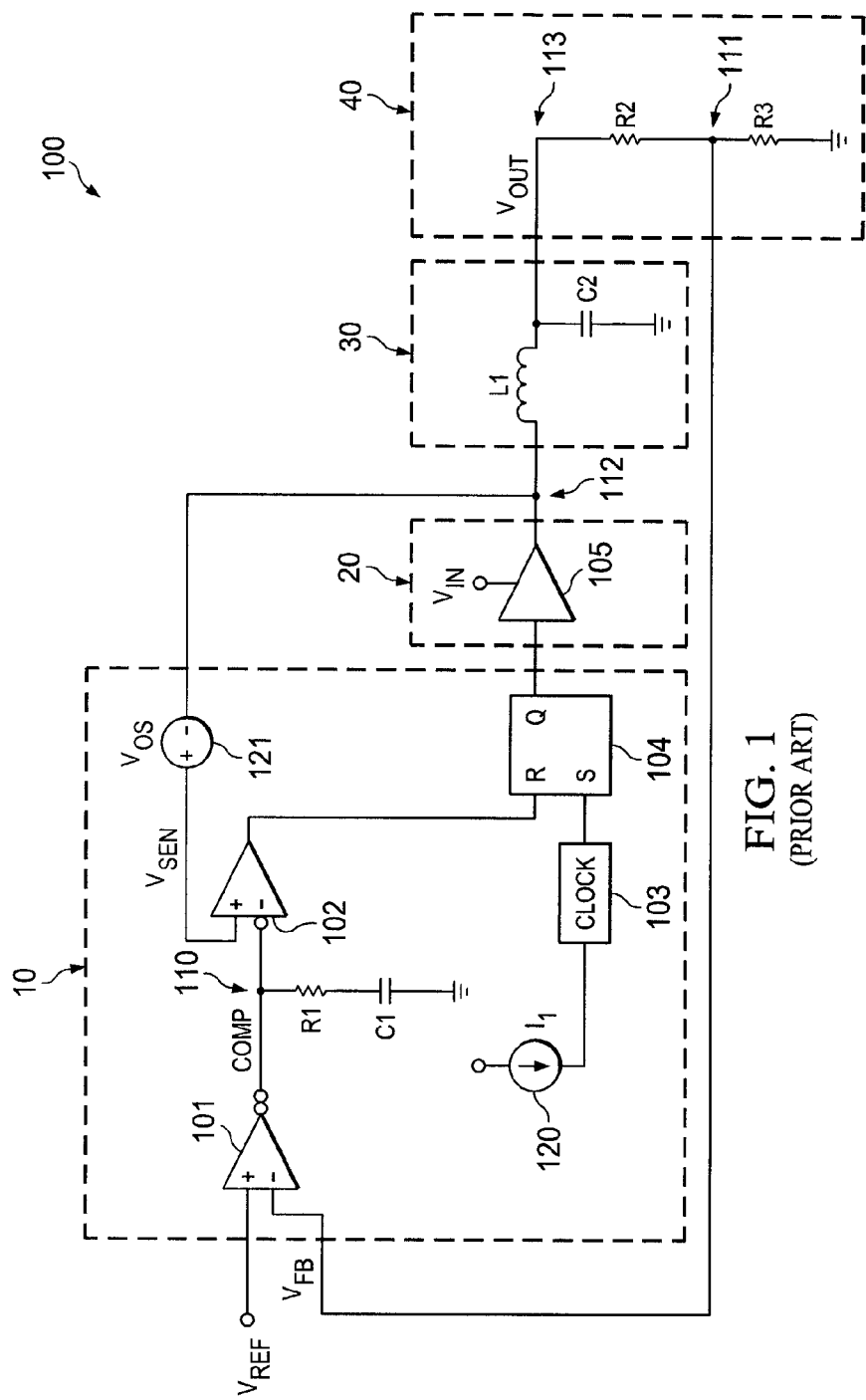
FIG. 1 is a circuit schematic of a peak-current mode step-down (buck) converter using pulse width modulation ("PWM")

FIG. 1 illustrates an embodiment of a conventional step-down DC-DC converter circuit 100. In general, the converter circuit 100 includes a pulse generator section 10, a power driver section 20, an output filter section 30, and a load section 40.

The pulse generator section 10 includes a transconductance amplifier 101, or transconductor, that serves as an error amplifier and generates a current output signal COMP at node 110 from a comparison of two voltage input signals, namely a first voltage signal $V_{REF}$ and a second voltage signal $V_{FB}$. The first voltage signal $V_{REF}$ is coupled to the non-inverting input + of the transconductor 101 and the second voltage signal $V_{FB}$ is coupled to the inverting input − of the transconductor. The first voltage signal $V_{REF}$ is a reference voltage from an external source while the second voltage signal $V_{FB}$ is a feedback voltage taken from the load section 40 of circuit 100 at node 111.

The current output signal COMP of the transconductor 101 at node 110 is coupled through an inverter to the inverting input − of a comparator 102. A third voltage signal $V_{SEN}$ is coupled to the non-inverting input + of the comparator 102. The third voltage signal $V_{SEN}$ is a voltage sense signal generated by a voltage source $V_{OS}$ that is coupled between the switching node 112 and the non-inverting input + of the comparator 102.

An RC network having a first resistor $R_1$ in series with a first capacitor $C_1$ is coupled between the output of the transconductor 101 at node 110 and ground. The RC network provides a capacitive bypass to the input to reduce ringing and spiking on the COMP signal.

A clock 103 generates pulses at a fixed frequency f that are coupled to the S input ("set") of an RS latch 104. A current source 120 drives the clock 103 with current $I_1$ to set the frequency. Although the current source 120 is shown as external to the clock 103, as a practical matter it is usually integrated with the clock.

The output of comparator 102 is coupled to the R input ("reset") of the RS latch 104. The output Q of the RS latch 104 is coupled to a power driver 105. The power driver 105 delivers a supply voltage $V_{IN}$ to the switching node 112 that is modulated by the pulses from clock 103. When the output Q is high, the driver 105 pulls the switching node 112 to the supply voltage $V_{IN}$. When the output Q is low, the driver 105 pulls the switching node 112 to ground. The output Q will be high when the S input is high and the R input is low. Conversely, the output Q will be low when the S input is low and the R input is high. The RS latch 104 is intended to prevent multiple pulses during each PWM cycle.

A voltage source 121 is coupled between the switching node 112 and the non-inverting input of the comparator 102. The voltage source 121 is an offset voltage $V_{OS}$ that delivers a sense voltage $V_{SEN}$ to the comparator 102.

The output filter 30 of circuit 100 includes an inductor $L_1$ coupled to the switching node 112 and a capacitor $C_2$ coupled in series with the inductor. The current developed in the inductor $L_1$ from a pulse delivered to the switching node 112 charges the capacitor $C_2$ to deliver the output voltage $V_{OUT}$ at node 113, which is delivered to a load represented by a pair of output resistors $R_2$ and $R_3$ coupled in series between the output node 113 and ground. Feedback node 110 is located at the interconnection of the output resistors $R_2$ and $R_3$ and provides the voltage feedback signal $V_{FB}$ to the transconductance amplifier 101.

In operation, the clock source 103 periodically sets the node Q, which delivers energy to the load. At a low load or no load condition, the output voltage $V_{OUT}$ rises due to the minimum on-time of the power stage 105 in delivering a minimum energy to the load. The excess energy causes the transconductor 101 to drive the COMP signal to a voltage level below the offset voltage $V_{OS}$. As a result, the switching and energy delivery stops. This is well-known as the "skip mode" operation of the converter.

Once the load consumes sufficient energy from the output capacitor $C_2$, the control loop re-enables switching. This process is chaotic, however, because there is no relationship between the internal clock source and the rate of energy demand and supply. Those familiar with control systems would recognize that under this condition, the control loop is not stable, because the switching frequency is less than the bandwidth of the loop. This causes a large voltage ripple to appear at the output node 113, which is undesirable.

Figure 2:
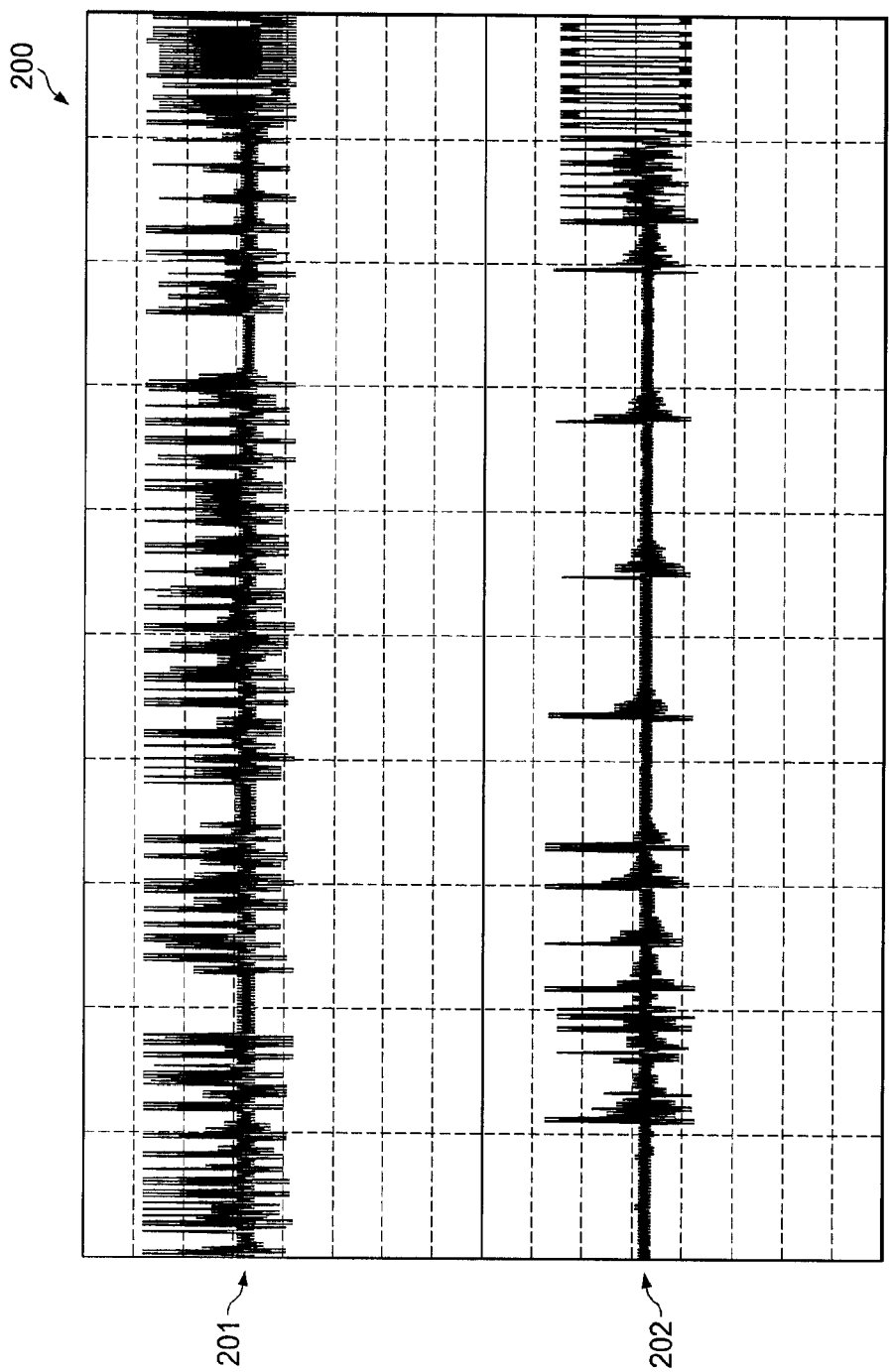
FIG. 2 is a graph of a switching waveform that results from operation of the circuit of FIG. 1.

Referring to FIG. 2, a graph 200 illustrates a typical switching waveform resulting from operation of the circuit 100 of FIG. 1 in skip mode. The top waveform 201 represents the pulses generated by the clock 103 and latch 104 at node Q. The bottom waveform 202 represents the voltage developed at the switching node 112. It can be seen from the bottom waveform 202 that the switching is sporadic and chaotic as a result of unstable loop operation of the circuit 100 in skip mode.

Figure 3:
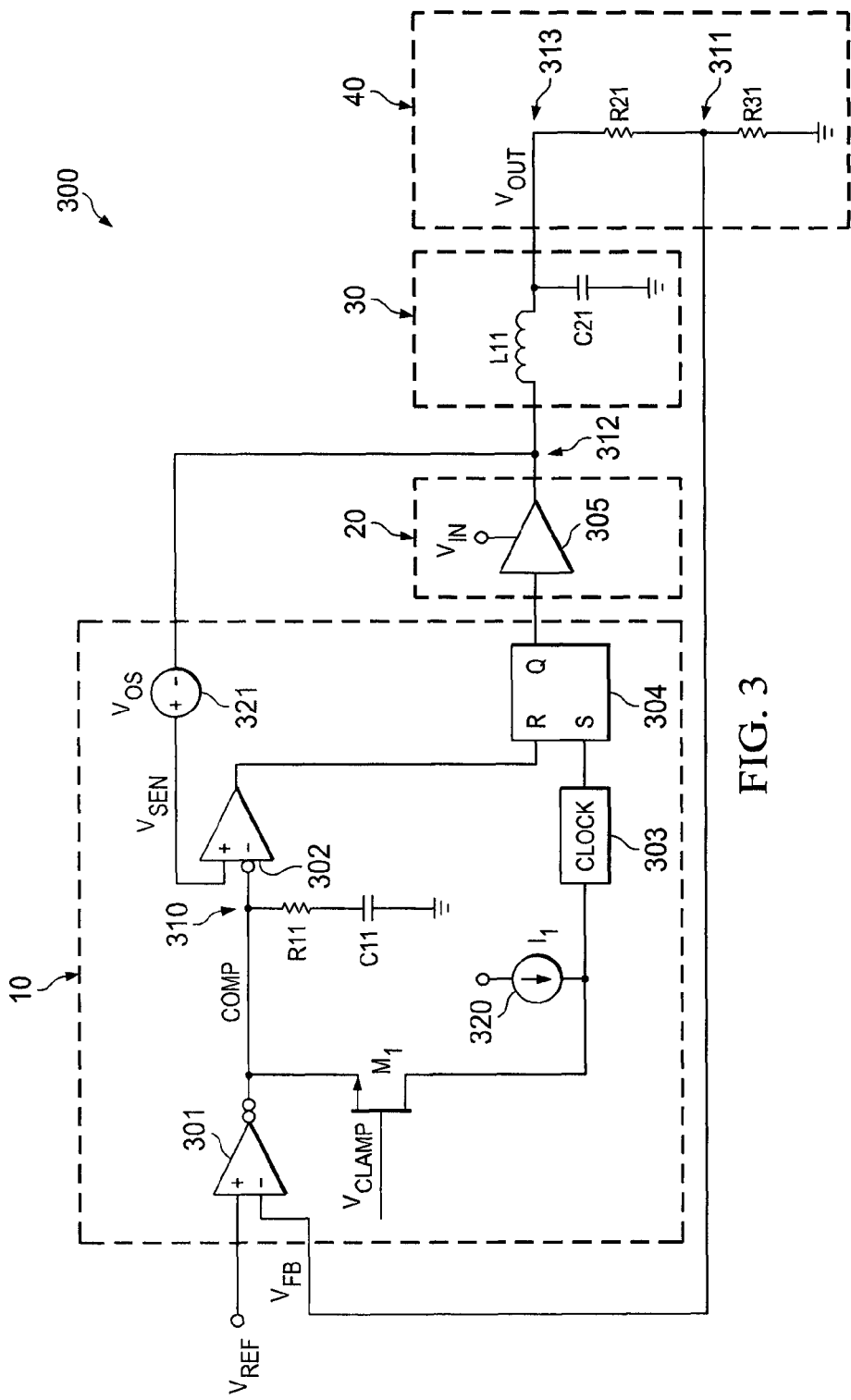
FIG. 3 is a circuit schematic of a peak-current mode step-down (buck) converter that automatically transitions between PWM and pulse frequency modulation ("PFM")

FIG. 3 illustrates an embodiment of an improved step-down converter circuit 300 having a pulse generator section 10, a power driver section 20, an output filter section 30, and a load section 40.

As in circuit 100, the converter circuit 300 includes a transconductor 301 that serves as an error amplifier and generates an output current signal COMP at node 310 from a comparison of two input signals, namely a first voltage signal $V_{REF}$, and a second voltage signal $V_{FB}$. The first voltage signal $V_{REF}$ is coupled to the non-inverting input of the transconductor 301 and the second voltage signal $V_{FB}$, is coupled to the inverting input of the transconductor. The first voltage signal $V_{REF}$ is a reference voltage from an external source while the second voltage signal $V_{FB}$ is a feedback voltage taken from the load section 40 of circuit 300 at node 311.

The current output signal COMP at node 310 is coupled through an inverter to the inverting input of a comparator 302. A third voltage signal $V_{SEN}$ is coupled to the non-inverting input of the comparator 302. The third voltage signal $V_{SEN}$ is a voltage sense signal generated by a voltage source $V_{OS}$ that is coupled between the switching node 312 and the non-inverting input of the comparator 302.

An RC network having a first resistor $R_{11}$ in series with a first capacitor $C_{11}$ is coupled between the output of the transconductor 301 at node 310 and ground. The RC network provides a capacitive bypass to the input to reduce ringing and spiking on the COMP signal.

A clamping transistor $M_1$ is a field effect transistor having its source is coupled to the output of transconductor 301 at node 310 and its drain coupled to the clock 303 and to current source 320. The gate of the clamping transistor $M_1$ is coupled to a reference voltage $V_{CLAMP}$. In operation, when the COMP signal decreases below a specified threshold, the transistor $M_1$ starts to turn on, and a portion of the current $I_1$ begins to flow through transistor $M_1$ instead of to the clock 303, thereby reducing the current to the clock and the effective clock frequency.

The clock 303 is coupled to the S input of an RS latch 304. The current source 320 drives the clock 303 with current $I_1$. For normal load conditions, the current $I_1$ drives the clock 303 to generate pulses at a fixed frequency f which are delivered to the S input of latch 304. For light load conditions, the clamping transistor $M_1$ takes away some of the current generated by the current source 320 thereby reducing the effective frequency of pulses delivered to the latch 304. The output of comparator 302 is coupled to the R input of the RS latch 304 and resets the latch when the magnitude of the COMP signal drops below a specified threshold.

The output Q of the RS latch 304 is coupled to a power driver 305. The power driver 305 delivers a supply voltage $V_{IN}$ to the switching node 312 that is modulated by the pulses from clock 303. Thus, when the output Q of latch 304 is high, the driver 305 pulls the switching node 312 to the supply voltage $V_{IN}$. When the output Q of latch 304 is low, the driver 305 pulls the switching node 312 to ground. The output Q of latch 304 will be high when the S input is high and the R input is low. Conversely, the output Q of latch 304 will be low when the S input is low and the R input is high.

The output stage 30 of circuit 300 includes an inductor $L_{11}$ coupled to the switching node 312 and a capacitor $C_{21}$ coupled in series with the inductor. The current developed in the inductor $L_{11}$ charges the capacitor $C_{21}$ to deliver the output voltage $V_{OUT}$ at node 313. A pair of output resistors $R_{21}$ and $R_{31}$ are coupled in series between the output node 313 and ground. Feedback node 310 is located at the interconnection of the output resistors $R_{21}$ and $R_{31}$.

In the operation of circuit 300, the switching never stops. However, when the energy demanded by the load is less than the energy that can be delivered per cycle, e.g., a no load or low load condition exists, the output voltage $V_{OUT}$ at node 313 rises, thus causing the transconductor 301 to drive the current signal COMP low. This in turn causes current from source 320 to flow through transistor $M_1$, which takes bias current away from the clock 303 thereby reducing the effective clock frequency until a new equilibrium can be reached.

The switching frequency is now much smoother because it is generated by an oscillator, not by an unstable loop. Those familiar with loop stability would recognize that the loop is always stable, because at a low load or no load condition, the signal COMP is clamped by transistor $M_1$, and the loop gain is effectively reduced. The loop is compensated by the output capacitor $C_{21}$ as the voltage on capacitor $C_{11}$ no longer changes. Therefore, the voltage ripple at the output of circuit 300 is less than in circuit 100.

Figure 4:
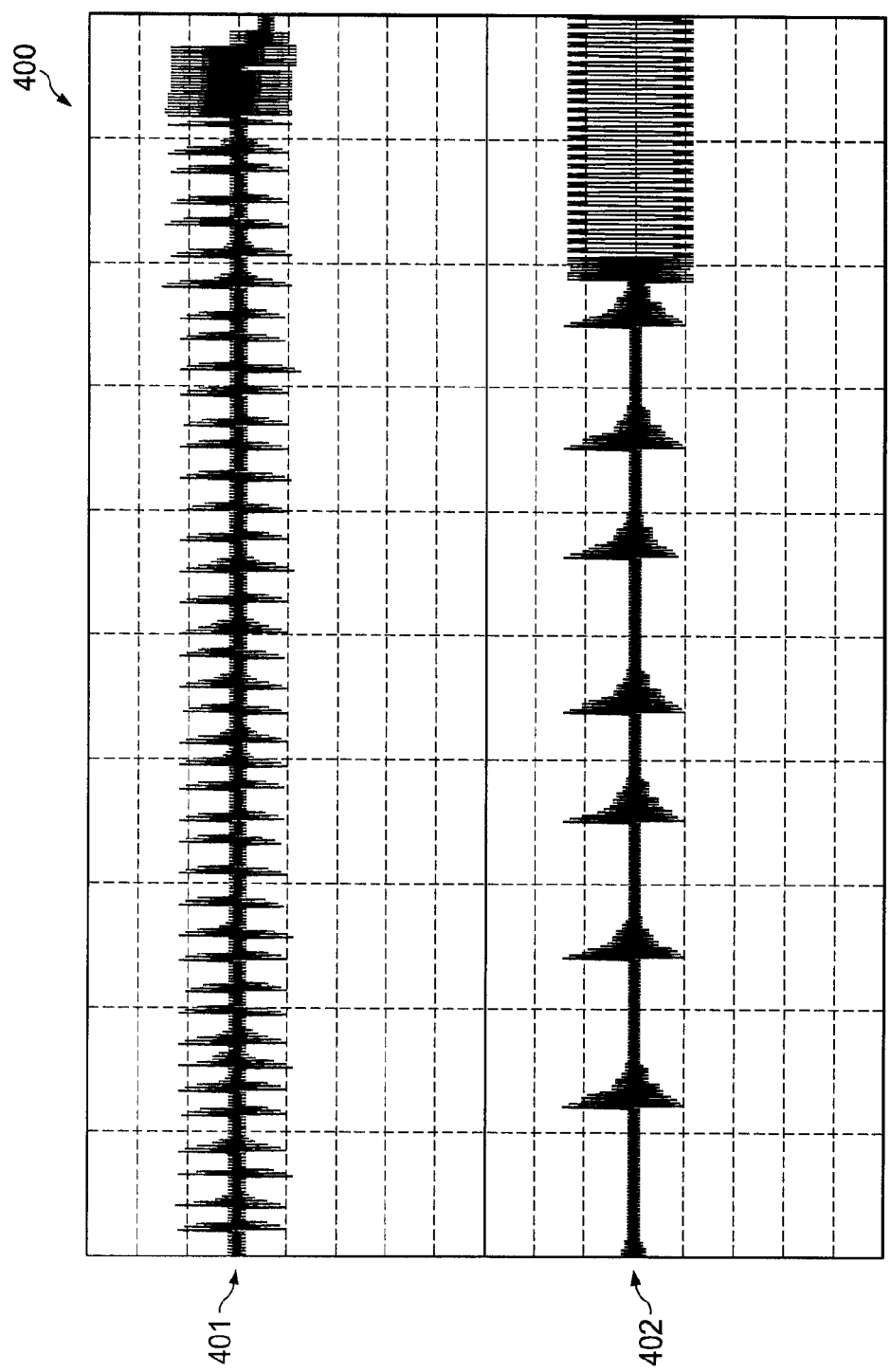
FIG. 4 is a graph of a switching waveform that results from operation of the circuit of FIG. 3.

Referring to FIG. 4, a graph 400 illustrates the switching waveform resulting from operation of the circuit 300 of FIG. 3. The top waveform 401 represents the pulses generated by the clock 303 and latch 304 at node Q. The bottom waveform 402 represents the voltage developed at the switching node 312. Thus, by reducing the effective frequency of clock 303 for light loads, the switching waveforms become generally even and stable, as shown in FIG. 4.

Figure 5:
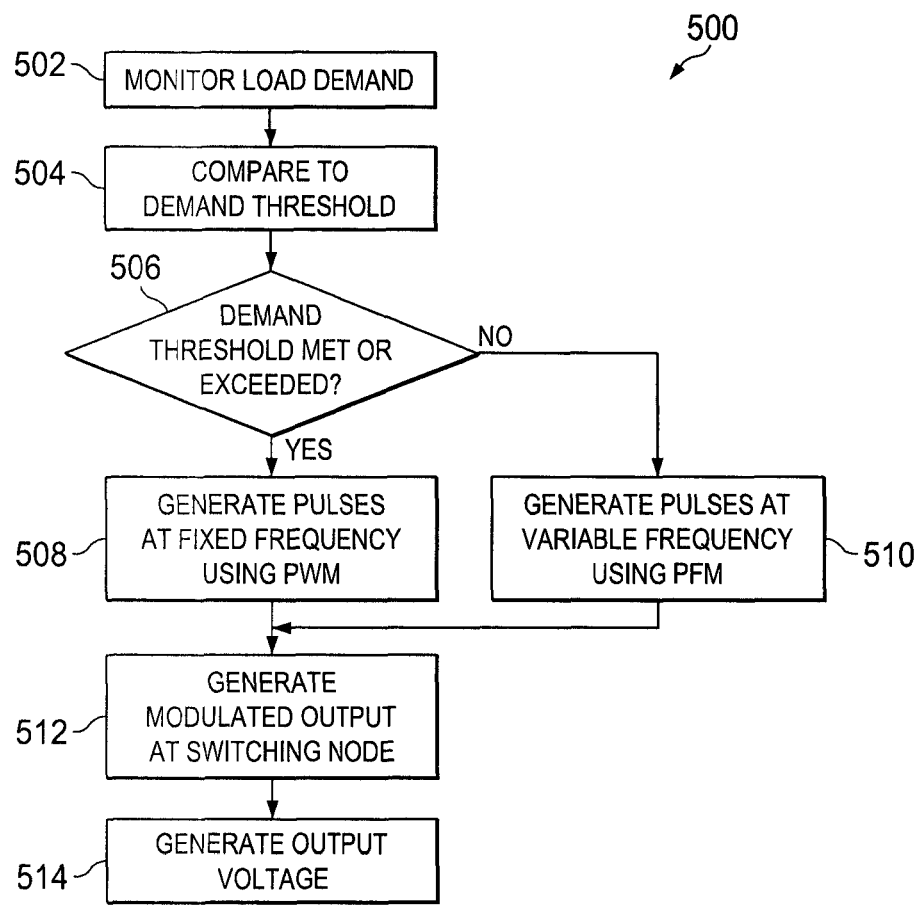
FIG. 5 is a flow chart illustrating a process for automatically transitioning between PWM and PFM modes of operation.

FIG. 5 illustrates a simple process 500 for automatically switching between PWM and PFM modes of operation. Process 500 can be implemented as described above or in alternative embodiments. In step 502, the demand for energy at the load is monitored. In step 504, the actual demand is compared to a predetermined demand threshold. The predetermined demand threshold is set such that operation at or above the threshold indicates a normal load, whereas operation below the threshold indicates a light load. Further, operation below the threshold is indicative of a rising output voltage $V_{OUT}$, which can be clamped with transistor $M_1$ as described above to reduce loop gain and provide stability.

If the demand threshold is met or exceeded by the actual demand in step 506, then the circuit is operated in the PWM mode in step 508 wherein the clock is operated at a fixed frequency determined by the input current to the clock, and pulses are generated at the fixed frequency. However, if the demand threshold is not met or exceeded by the actual demand in step 506, then the circuit is operated in the PFM mode in step 510 wherein the current to the clock is reduced such that the effective frequency of the clock is reduced. Thus, the clock is operated at a variable frequency based on the input current, and pulses having a fixed duration but variable frequency are generated. In step 512, the power stage operates to generate a modulated output at the switching node regardless of whether the PWM pulses or the PFM pulses are provided to the power stage. In step 514, the output voltage is generated using the output filter.

Although illustrative embodiments have been shown and described by way of example, a wide range of alternative embodiments is possible within the scope of the foregoing disclosure. For example, other means could be devised to generate and control the first and second series of pulses. Further, although the clock is described as controlled by current, an alternative configuration could be devised wherein the clock is controlled by voltage.

The invention claimed is:

1. A switching mode power supply circuit, comprising:
    a pulse generation circuit including an oscillator that is always on, the oscillator being configured to generate pulses using pulse width modulation for a first load condition that exceeds a predefined threshold and configured to generate pulses using pulse frequency modulation for a second load condition that does not exceed the predefined threshold;
    a power stage coupled to the pulse generation circuit and configured to convert an input voltage to a modulated voltage at a switching node using pulses generated by the pulse generation circuit;
    a clock circuit coupled to the power stage and to a bias current source, the bias current source driving the clock to generate pulses to drive the power stage;
    a circuit to take away some of current generated by the bias current source to operate the switch mode power supply in a pulse frequency modulation (PFM) mode; and
    an output filter circuit coupled to the switching node and configured to produce an output voltage from the modulated voltage.

2. The circuit of claim 1, the pulse generation circuit comprising:
    a clock circuit coupled to the power stage;
    a current source coupled to drive the clock circuit with a drive current;
    a clamp circuit coupled to the current source and configured to reduce the drive current provided to the clock circuit when the second load condition is sensed.

3. The circuit of claim 2, further comprising:
    a clock coupled to the current source; and
    a latch coupled to the clock and having a set input, a reset input, and an output, the output of the latch being coupled to the power stage.

4. A switching mode power supply circuit, comprising:
    a pulse generation circuit including an oscillator that is always on, the oscillator being configured to generate pulses using pulse width modulation for a first load condition that exceeds a predefined threshold and configured to generate pulses using pulse frequency modulation for a second load condition that does not exceed the predefined threshold;
    a power stage coupled to the pulse generation circuit and configured to convert an input voltage to a modulated voltage at a switching node using pulses generated by the pulse generation circuit;
    an output filter circuit coupled to the switching node and configured to produce an output voltage from the modulated voltage, the pulse generation circuit comprising:
    a transconductance amplifier having an inverting input coupled to a voltage feedback signal and a non-inverting input coupled to a voltage reference for generating a compare signal as an output;
    a comparator having a non-inverting input coupled to an voltage offset signal and an inverting input coupled to the output of the transconductance amplifier for generating a reset signal as an output;
    a clock having an input driven by a drive current for generating a set signal as an output;
    a latch having a reset input coupled to the reset signal from the comparator and a set input coupled to the set signal from the clock for generating a gate drive signal as an output, the gate drive signal coupled to the power stage; and
    a clamp configured to drain at least some of the drive current away from the clock when the compare signal drops below the predetermined threshold,
    the clamp comprising a field effect transistor having a source coupled to the output of the transconductance amplifier, a drain coupled to the input of the clock, and a gate coupled to a clamping voltage.

5. The circuit of claim 4, the voltage offset signal being generated by an offset voltage source that is connected between the switching node and the non-inverting input of the comparator.

6. The circuit of claim 4, further comprising:
a resistive divider network having at least two resistors coupled in series, the resistive divider network being coupled to the output voltage, the voltage feedback signal being developed at an interconnection of the two resistors.

7. The circuit of claim 4, the output filter circuit comprising an inductor coupled in series with a capacitor, the inductor being coupled to the switching node.

8. The circuit of claim 4, further comprising an RC network coupled between the output of the transconductance amplifier and ground.

9. A switching mode power supply circuit, comprising:
a transconductance amplifier configured to compare two input voltages and generate a compare signal as an output;
a comparator configured to compare the compare signal with an offset voltage signal and generate a reset signal as an output;
a clock driven by a drive current and configured to generate a series of pulses as an output;
a latch having a reset input coupled to the output of the comparator, a set input coupled to the output of the clock, and an output;
a clamp configured to drain at least some of the drive current away from the clock when the compare signal drops below a predetermined threshold, the clamp comprising a field effect transistor having a source coupled to the output of the transconductance amplifier, a drain coupled to the input of the clock, and a gate coupled to a clamping voltage;
a power driver having an input coupled to the output of the latch for generating an output at a switching node;
an output filter having active elements coupled to the switching node for generating a voltage output; and
a resistive divider network having at least two resistors coupled in series, the resistive divider network coupled to the voltage output.

10. The circuit of claim 9, the transconductance amplifier is an operational amplifier having an inverting input coupled to a voltage feedback signal and a non-inverting input coupled to a voltage reference signal.

11. The circuit of claim 9, the comparator is an operational amplifier having an inverting input coupled to the output of the transconductance amplifier and a non-inverting input coupled to the voltage offset signal.

12. The circuit of claim 9, the clock generating pulses at a first frequency using pulse width modulation when the compare signal does not drop below the predetermined threshold and generating pulses at a variable frequency and fixed duration when the compare signal drops below the predetermined threshold.

13. The circuit of claim 11, the voltage offset signal being generated by an offset voltage source that is connected between the switching node and the non-inverting input of the comparator.

14. The circuit of claim 10, wherein the voltage feedback signal is developed at an interconnection of the two resistors of the resistive divider network.

15. A method for operating a switching mode power supply, comprising:
generating pulses at a fixed frequency using pulse width modulation when a first signal comparing two input voltages exceeds a predetermined threshold level;
generating pulses at a variable frequency and fixed duration when the first signal does not exceed the predetermined threshold level;
generating the pulses at the fixed frequency and a variable frequency utilizing oscillator is always on;
utilizing a clock circuit coupled to a power stage and to a bias current source, the bias current source driving the clock to generate the pulses to drive the power stage;
taking away some of the current generated by the bias current source to operate the switch mode power supply and a pulse frequency modulation (PFM) mode:
providing the pulses to the power stage, the power stage using the pulses to modulate an input voltage thereby generating a modulated output; and
generating an output voltage from the modulated output using an output filter.

16. The method of claim 15, further comprising:
providing a clock to generate the pulses;
driving the clock with a drive current; and
reducing the drive current when the first signal does not exceed the predetermined threshold level.

* * * * *